(12) United States Patent
Yang

(10) Patent No.: US 12,305,296 B2
(45) Date of Patent: May 20, 2025

(54) ELECTROCHEMICAL SYSTEM

(71) Applicants: HYUNDAI MOTOR COMPANY, Seoul (KR); KIA CORPORATION, Seoul (KR)

(72) Inventor: Seung Ki Yang, Yongin-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 434 days.

(21) Appl. No.: 17/830,515

(22) Filed: Jun. 2, 2022

(65) Prior Publication Data
US 2023/0287584 A1    Sep. 14, 2023

(30) Foreign Application Priority Data

Sep. 29, 2021   (KR) ................. 10-2021-0129214

(51) Int. Cl.
*C25B 1/04*       (2021.01)
*C25B 9/73*       (2021.01)
*C25B 15/027*     (2021.01)
*C25B 15/033*     (2021.01)
*C25B 15/08*      (2006.01)

(52) U.S. Cl.
CPC .......... *C25B 1/04* (2013.01); *C25B 9/73* (2021.01); *C25B 15/027* (2021.01); *C25B 15/033* (2021.01); *C25B 15/08* (2013.01); *C25B 15/085* (2021.01); *C25B 15/087* (2021.01); *Y02E 60/36* (2013.01)

(58) Field of Classification Search
CPC ....... C25B 1/04; C25B 15/027; C25B 15/033; C25B 15/08; C25B 15/085; C25B 15/087

USPC ................ 204/235, 236, 238, 239, 245, 269
See application file for complete search history.

(56) References Cited

U.S. PATENT DOCUMENTS

| 4,832,804 A | * | 5/1989 | Brattan | ................... C25B 15/08 204/263 |
| 5,690,797 A | * | 11/1997 | Harada | ..................... C25B 1/04 204/266 |
| 10,053,785 B2 | | 8/2018 | Smarsch et al. | |

(Continued)

FOREIGN PATENT DOCUMENTS

| EP | 3604617 A1 | 2/2020 |
| JP | 2002166278 A | 6/2002 |

(Continued)

*Primary Examiner* — Brian W Cohen
*Assistant Examiner* — Alexander R. Parent
(74) *Attorney, Agent, or Firm* — Lempia Summerfield Katz LLC

(57) ABSTRACT

An electrochemical system includes: a gas-liquid separator configured to separate a reaction fluid into a gaseous reaction fluid and a liquid reaction fluid; a first circulation line connected to the gas-liquid separator and configured to circulate the liquid reaction fluid; a water electrolysis stack provided in the first circulation line; a first pump provided in the first circulation line; a second circulation line connected to the gas-liquid separator in parallel with the first circulation line and configured to circulate the liquid reaction fluid; a property processing unit provided in the second circulation line and configured to process properties of the liquid reaction fluid; and a second pump provided in the second circulation line, thereby reducing a load of the pump and improving efficiency of the system.

7 Claims, 4 Drawing Sheets

(56) References Cited

U.S. PATENT DOCUMENTS

| | | | | |
|---|---|---|---|---|
| 11,603,599 B2 * | 3/2023 | Ballantine | ................. | C25B 1/04 |
| 11,811,109 B2 * | 11/2023 | Mohri | ................. | H01M 8/0656 |
| 2019/0218676 A1 * | 7/2019 | Noda | ........................ | C25B 9/73 |
| 2020/0190674 A1 | 6/2020 | Höller | | |
| 2022/0145476 A1 * | 5/2022 | Yoshida | .................... | C25B 9/73 |

FOREIGN PATENT DOCUMENTS

| | | | | |
|---|---|---|---|---|
| JP | 3991146 B2 | | 8/2007 | |
| JP | 2014118619 A | * | 6/2014 | ............. C25B 15/08 |
| JP | 6047473 B2 | | 11/2016 | |
| JP | 6895784 B2 | | 6/2021 | |
| KR | 20200060146 A | | 5/2020 | |
| KR | 102184353 B1 | | 12/2020 | |
| WO | WO-2020208991 A1 | * | 10/2020 | ............... C25B 1/04 |

\* cited by examiner

ELECTROCHEMICAL SYSTEM

CROSS-REFERENCE TO RELATED APPLICATION

This application claims priority to and the benefit of Korean Patent Application No. 10-2021-0129214, filed in the Korean Intellectual Property Office on Sep. 29, 2021, the entire contents of which are incorporated herein by reference.

TECHNICAL FIELD

An embodiment of the present disclosure relates to an electrochemical system, and more particularly, to an electrochemical system capable of improving performance, efficiency, and durability.

BACKGROUND

The statements in this section merely provide background information related to the present disclosure and may not constitute prior art.

Hydrogen energy is attracting attention as a practical solution for solving environment and energy issues.

In particular, because hydrogen has high energy density and properties suitable for application in a grid-scale, hydrogen is in the limelight as a future energy carrier.

A water electrolysis stack, which is one of electrochemical devices, refers to a device that produces hydrogen and oxygen by electrochemically decomposing water. The water electrolysis stack may be configured by stacking several tens or several hundreds of water electrolysis cells (unit cells) in series.

Meanwhile, a reaction fluid discharged from the water electrolysis stack may flow along a circulation line and be treated by a gas-liquid separator which separates the discharged reaction fluid into a gaseous reaction fluid and a liquid reaction fluid. Then, the liquid reaction fluid (e.g., water) may be supplied back to the water electrolysis stack along the circulation line. In addition, the circulation line is equipped with an ion filter configured to remove (filter out) ions from the liquid reaction fluid, and a property processing unit configured to process the properties of the liquid reaction fluid, such as a heat exchanger for adjusting a temperature of the liquid reaction fluid (e.g., cooling the liquid reaction fluid).

However, in the related art, the water electrolysis stack and the property processing unit (e.g., the ion filter and the heat exchanger) are connected in series on the circulation line, and only a single pump provided in the circulation line moves (circulates) the liquid reaction fluid along the circulation line. For this reason, it is difficult to optimize a condition (e.g., a flow rate and a pressure) for supplying the liquid reaction fluid to the water electrolysis stack and the property processing unit. Further, it is difficult to maximize the performance and efficiency of the water electrolysis stack and the property processing unit or components of a driving device.

That is, to ensure the performance and efficiency of the water electrolysis stack, the flow rate and pressure of the liquid reaction fluid to be supplied to the water electrolysis stack along the circulation line needs to be designed not to depend on the properties of components of other driving devices. For example, the pressure and flow rate of the liquid reaction fluid may be designed to be high to advantageously increase an output of the water electrolysis stack. If the circulation line for the liquid reaction fluid, which is connected to the property processing unit or the water electrolysis stack, is connected to the components of the driving device in series, the flow rate and pressure of the liquid reaction fluid to be supplied to the property processing unit are increased to a certain level or higher because of the high pressure and flow rate of the liquid reaction fluid. For this reason, the ion exchange efficiency (ion removing efficiency) of the ion filter deteriorates, which may affect deformation (deterioration in durability) in a fine heat exchange channel of the heat exchanger.

As described above, because the condition for supplying the liquid reaction fluid for ensuring the performance and efficiency of the water electrolysis stack differs from the condition for supplying the liquid reaction fluid for ensuring the performance of the property processing unit (e.g., the ion filter and the heat exchanger), there is a problem in that it is difficult for the single pump provided in the circulation line to simultaneously satisfy the condition (the flow rate and the pressure) for supplying the liquid reaction fluid to the water electrolysis stack and the condition (the flow rate and the pressure) for supplying the liquid reaction fluid to the property processing unit.

Therefore, recently, various studies have been conducted to ensure the performance and efficiency of both the water electrolysis stack and the property processing unit while ensuring the durability, but the study results are still insufficient.

SUMMARY

The present disclosure provides an electrochemical system capable of improving performance, efficiency, and durability.

In particular, the present disclosure separately optimizes a flow rate and pressure of a liquid reaction fluid to be supplied to a water electrolysis stack and a property processing unit.

The present disclosure improves ionic conduction and ion exchange efficiency of a reaction fluid and improves efficiency in adjusting a temperature of the reaction fluid to be supplied to a stack by optimizing a flow rate and pressure of the reaction fluid.

The present disclosure reduces a size of a pump and minimizes a load of the pump.

The present disclosure minimizes power consumption of a pump and improves energy efficiency.

The present disclosure simplifies a structure and improves a degree of design freedom and spatial utilization.

The present disclosure does not need a separate pump for supplying a liquid reaction fluid to a gas-liquid separator.

The objects to be achieved by the embodiments are not limited to the above-mentioned objects, but also include objects or effects that may be understood from the solutions or embodiments described below.

An embodiment of the present disclosure provides an electrochemical system including: a gas-liquid separator configured to separate a reaction fluid into a gaseous reaction fluid and a liquid reaction fluid; a first circulation line connected to the gas-liquid separator and configured to circulate the liquid reaction fluid; a water electrolysis stack provided in the first circulation line; a first pump provided in the first circulation line; a second circulation line connected to the gas-liquid separator in parallel with the first circulation line and configured to circulate the liquid reaction fluid; a property processing unit provided in the second circulation line and configured to process properties of the liquid reaction fluid; and a second pump provided in the second circulation line.

This is to improve the performance and efficiency while ensuring the durability.

That is, in the related art, the water electrolysis stack and the property processing unit (e.g., the ion filter and the heat exchanger) are connected in series on the circulation line, and only a single pump provided in the circulation line moves (circulates) the liquid reaction fluid along the circulation line. For this reason, it is difficult to optimize a condition (e.g., a flow rate and a pressure) for supplying the liquid reaction fluid to the water electrolysis stack and the property processing unit. Further, it is difficult to maximize the performance and efficiency of the water electrolysis stack and the property processing unit and components of a driving device.

In particular, because the condition for supplying the liquid reaction fluid for ensuring the performance and efficiency of the water electrolysis stack differs from the condition for supplying the liquid reaction fluid for ensuring the performance of the property processing unit (e.g., the ion filter and the heat exchanger), there is a problem in that it is difficult for the single pump provided in the circulation line to simultaneously satisfy the condition (the flow rate and the pressure) for supplying the liquid reaction fluid to the water electrolysis stack and the condition (the flow rate and the pressure) for supplying the liquid reaction fluid to the property processing unit.

However, according to the embodiment of the present disclosure, the first circulation line and the second circulation line may be connected in parallel with each other to the gas-liquid separator. The first pump may supply the liquid reaction fluid to the water electrolysis stack provided in the first circulation line, and the liquid reaction fluid treated (separated) by the gas-liquid separator may separately circulate along the first circulation line and the second circulation line. In addition, the first pump provided in the first circulation line may supply the liquid reaction fluid to the water electrolysis stack provided in the first circulation line, and the second pump provided in the second circulation line may supply the liquid reaction fluid to the property processing unit provided in the second circulation line. Therefore, both the condition (e.g., the pressure and the flow rate) for supplying the liquid reaction fluid to the water electrolysis stack and the condition for supplying the liquid reaction fluid to the property processing unit may be simultaneously satisfied. Therefore, the performance and efficiency of the system are improved.

In the embodiment of the present disclosure, the second pump operates separately from the first pump and may adjust the condition for supplying the liquid reaction fluid to the property processing unit, and the condition for supplying the liquid reaction fluid to the property processing unit may be maintained as a preset reference condition. Therefore, it reduces or minimizes the deterioration in performance of the property processing unit and the damage to the property processing unit that may be caused when the condition for supplying the liquid reaction fluid deviates from the reference condition, thereby improving the durability thereof.

According to the exemplary embodiment of the present disclosure, the first pump may be provided in the first circulation line and disposed between an inlet of the water electrolysis stack and the gas-liquid separator.

Various processing devices capable of processing the properties of the liquid reaction fluid may be used as the property processing unit.

For reference, in the embodiment of the present disclosure, the configuration in which the properties of the liquid reaction fluid are processed means that the properties (or states) of the liquid reaction fluid, such as a temperature and an ion content of the liquid reaction fluid, are processed (adjusted).

According to the exemplary embodiment of the present disclosure, the property processing unit may include at least one of an ion filter provided in the second circulation line and configured to filter out ions from the liquid reaction fluid or a heat exchanger provided in the second circulation line and configured to exchange heat with the liquid reaction fluid.

According to the exemplary embodiment of the present disclosure, the electrochemical system may include a branch line having a first end connected to the second circulation line and disposed between an inlet of the ion filter and the gas-liquid separator, and a second end connected to the second circulation line and disposed between an outlet of the ion filter and the gas-liquid separator, and the heat exchanger may be provided in the branch line.

In particular, the second pump may be provided in the second circulation line and positioned at an upstream side of the branch line.

According to the exemplary embodiment of the present disclosure, the electrochemical system may include: an ion sensor provided in the first circulation line and configured to sense the ion contained in the liquid reaction fluid; and a temperature sensor provided in the first circulation line and configured to sense a temperature of the liquid reaction fluid. The second pump may adjust a flow rate of the liquid reaction fluid passing through the second pump, on the basis of sensing results of at least any one of the ion sensor and the temperature sensor.

As described above, the ion sensor and the temperature sensor may be provided in the first circulation line, and the flow rate of the liquid reaction fluid passing through the second pump may be adjusted on the basis of the temperature of the liquid reaction fluid sensed by the temperature sensor and the ion (ion content) in the liquid reaction fluid sensed by the ion sensor. Therefore, it is possible to supply the liquid reaction fluid to the ion filter and the heat exchanger under the condition capable of optimizing the operation of the water electrolysis stack (with the flow rate capable of maximizing the performance and efficiency of the ion filter and the heat exchanger).

According to the exemplary embodiment of the present disclosure, the electrochemical system may include a valve provided in the second circulation line and disposed between the second pump and the ion filter. The valve may adjust the flow rate of the liquid reaction fluid to be supplied to the ion filter, on the basis of the sensing result of at least any one of the ion sensor and the temperature sensor.

As described above, the present disclosure improves the performance and efficiency of the ion filter by selectively adjusting the flow rate of the liquid reaction fluid to be supplied to the ion filter.

In addition, the flow rate of the liquid reaction fluid passing through the heat exchanger may be adjusted by selectively adjusting the flow rate of the liquid reaction fluid to be supplied to the ion filter. Therefore, it is possible to more accurately and quickly control the temperature of the liquid reaction fluid. For example, when the temperature of the water electrolysis stack is raised to a predetermined level or higher, the liquid reaction fluid supplied to the second circulation line may entirely pass through the heat exchanger without passing through the ion filter. Therefore, it is possible to more quickly lower the temperature of the liquid reaction fluid.

According to the exemplary embodiment of the present disclosure, the electrochemical system may include a supply line connected to the gas-liquid separator and configured to supply the liquid reaction fluid to the gas-liquid separator.

In particular, an outlet end of the first circulation line may be connected to the supply line, and the liquid reaction fluid having passed through the first circulation line may be supplied to the gas-liquid separator via the supply line.

Because the outlet end of the first circulation line is connected to the supply line as described above, the liquid reaction fluid (additional reaction fluid) with which the supply line is filled may be supplied to the gas-liquid separator by means of the liquid reaction fluid (circulating reaction fluid) discharged through the outlet end of the first circulation line. Therefore, it is possible to exclude the use of a separate pump for supplying the liquid reaction fluid, with which the supply line is filled, to the gas-liquid separator.

More particularly, the electrochemical system may include: a nozzle connected to the outlet end of the first circulation line and configured to inject the liquid reaction fluid into the supply line along the supply line; and an ejector disposed at an end of the nozzle.

Further areas of applicability should become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
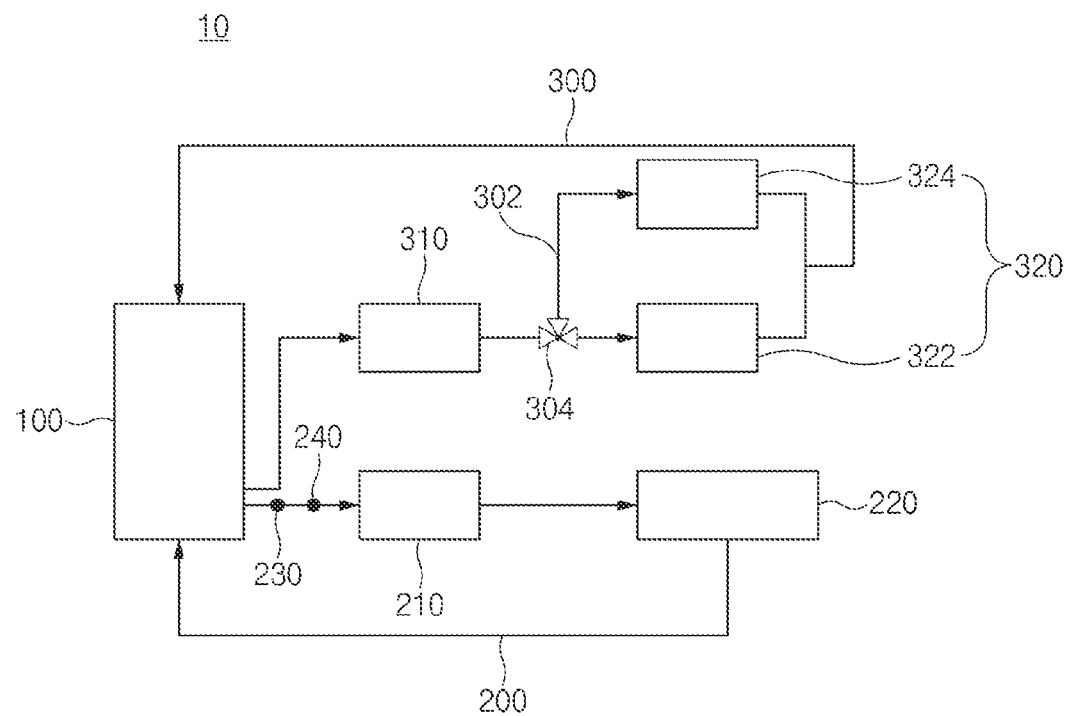
FIG. 1 is a view for explaining an electrochemical system according to an embodiment of the present disclosure.

The drawings described herein are for illustration purposes only and are not intended to limit the scope of the present disclosure in any way.

DETAILED DESCRIPTION

Hereinafter, exemplary embodiments of the present disclosure are described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, or C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

When a component, device, element, or the like of the present disclosure is described as having a purpose or performing an operation, function, or the like, the component, device, or element should be considered herein as being "configured to" meet that purpose or to perform that operation or function.

Figure 2:
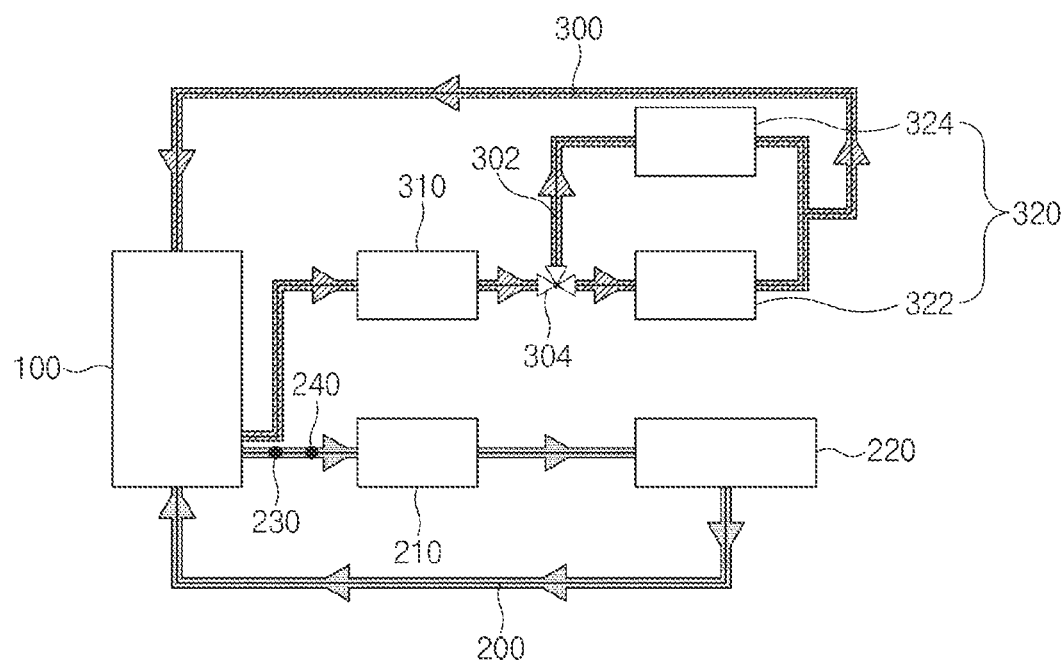
FIG. 2 is a view for explaining a flow of a liquid reaction fluid in the electrochemical system according to an embodiment of the present disclosure.
Figure 3:
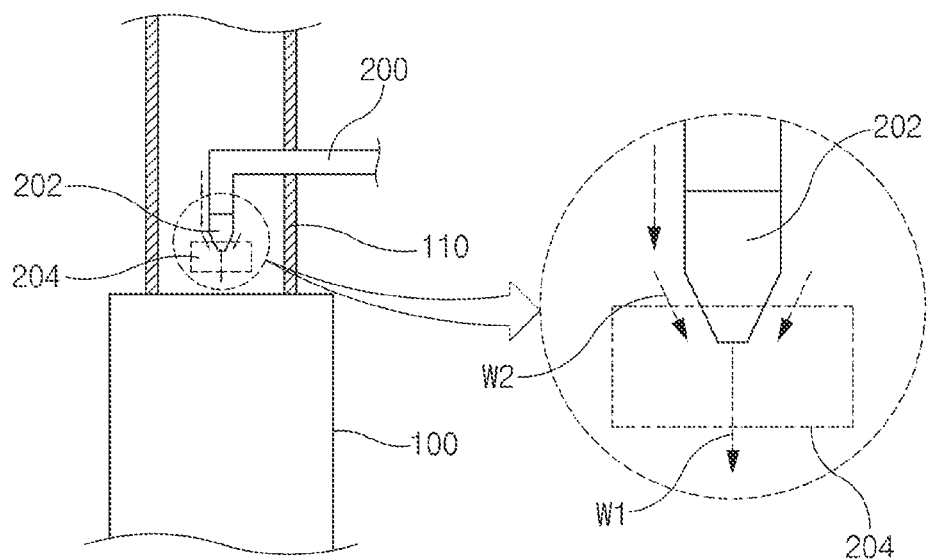
FIG. 3 is a view for explaining a nozzle and an ejector of the electrochemical system according to one embodiment of the present disclosure.

Referring to FIGS. 1 to 3, an electrochemical system 10 includes: a gas-liquid separator 100 configured to separate a reaction fluid into a gaseous reaction fluid and a liquid reaction fluid, a first circulation line 200 connected to the gas-liquid separator 100 and configured to circulate the liquid reaction fluid, a water electrolysis stack 220 provided in the first circulation line 200, a first pump 210 provided in the first circulation line 200, a second circulation line 300 connected to the gas-liquid separator 100 in parallel with the first circulation line 200 and configured to circulate the liquid reaction fluid, a property processing unit 320 provided in the second circulation line 300 and configured to process properties of the liquid reaction fluid, and a second pump 310 provided in the second circulation line 300.

For reference, the electrochemical system 10 according to the embodiment of the present disclosure may be used to generate electrochemical reactions between various reaction fluids in accordance with required conditions and design specifications. The present disclosure is not restricted or limited by the type and property of the reaction fluid used for the electrochemical system 10.

For example, the electrochemical system 10 according to the embodiment of the present disclosure may be used to produce hydrogen and oxygen by decomposing water (reaction fluid) through an electrochemical reaction.

The gas-liquid separator 100 serves to separate the reaction fluid (e.g., water) into a gaseous reaction fluid (e.g., oxygen) and a liquid reaction fluid (e.g., water).

Various separation devices capable of separating the reaction fluid into the gaseous reaction fluid and the liquid reaction fluid may be used as the gas-liquid separator 100. The present disclosure is not restricted or limited by the type and structure of the gas-liquid separator 100.

For example, the gas-liquid separator 100 may separate the reaction fluid, discharged from the water electrolysis stack 220, into the gaseous reaction fluid (e.g., oxygen) and the liquid reaction fluid (e.g., water).

The first circulation line 200 is connected to the gas-liquid separator 100 via the water electrolysis stack 220.

More specifically, the reaction fluid (the gaseous reaction fluid and the liquid reaction fluid) discharged from the water electrolysis stack 220 may be supplied to the gas-liquid separator 100 along the first circulation line 200. The liquid reaction fluid separated by the gas-liquid separator 100 may be supplied back to the water electrolysis stack 220 along the first circulation line 200.

The first circulation line 200 may have various structures capable of being connected to the gas-liquid separator 100 via the water electrolysis stack 220. The present disclosure is not restricted or limited by the structure and shape of the first circulation line 200.

In one form, the first circulation line 200 is connected to an approximately lower end (based on FIG. 1) of the gas-liquid separator 100. For example, an inlet end of the first circulation line 200 may be connected to a lateral surface of a lower end of the gas-liquid separator 100, and an outlet end of the first circulation line 200 may be connected to a bottom surface of the lower end of the gas-liquid separator 100.

In particular, the inlet end of the first circulation line 200 may be connected to the gas-liquid separator 100 so that the inlet end of the first circulation line 200 is positioned at a position lower than a level of the liquid reaction fluid separated by the gas-liquid separator 100. For example, the inlet end of the first circulation line 200 may be connected to the gas-liquid separator 100 so that the inlet end of the first circulation line 200 is positioned between the lower end of the gas-liquid separator 100 and a section corresponding to approximately ⅓ of a height of the gas-liquid separator 100. More particularly, the inlet end of the first circulation line 200 may be connected to a lowermost end of the gas-liquid separator 100.

According to another embodiment of the present disclosure, the first circulation line may be connected to an upper end or other portions of the gas-liquid separator.

The water electrolysis stack 220 is provided in the first circulation line 200 and produces hydrogen and oxygen by decomposing the water (reaction fluid) through an electrochemical reaction.

The water electrolysis stack 220 may have various structures capable of producing hydrogen and oxygen by decomposing the reaction fluid through the electrochemical reaction. The present disclosure is not restricted or limited by the type and structure of the water electrolysis stack 220.

For example, the water electrolysis stack 220 may be made by stacking a plurality of unit cells (not illustrated) in a preset reference stacking direction.

More specifically, the unit cell may include a reaction layer (not illustrated), and separators (not illustrated) respectively stacked on two opposite surfaces of the reaction layer.

The water electrolysis stack 220 may be configured by stacking the plurality of unit cells in the reference stacking direction and then fastening endplates (not illustrated) to two opposite ends of the stack of the plurality of unit cells.

The reaction layer may have various structures capable of generating the electrochemical reaction of the reaction fluid (e.g., water). The present disclosure is not restricted or limited by the type and structure of the reaction layer.

For example, the reaction layer may include a membrane electrode assembly (MEA) (not illustrated), a first porous transport layer (not illustrated) in close contact with one surface of the membrane electrode assembly, and a second porous transport layer (not illustrated) in close contact with the other surface of the membrane electrode assembly.

The membrane electrode assembly may be variously changed in structure and material in accordance with required conditions and design specifications. The present disclosure is not restricted or limited by the structure and material of the membrane electrode assembly.

For example, the membrane electrode assembly may be configured by attaching catalyst electrode layers (e.g., an anode electrode layer and a cathode electrode layer), in which electrochemical reactions are generated, to two opposite surfaces of an electrolyte membrane.

The first and second porous transport layers may uniformly distribute the reaction fluid and each have a porous structure having pores with predetermined sizes.

For reference, water supplied to the anode electrode layer, which is an oxidation electrode for the water electrolysis, is separated into hydrogen ions (protons), electrons, and oxygen. The hydrogen ions move to the cathode electrode layer, which is a reduction electrode, through the electrolyte membrane, and the electrons move to a cathode through an external circuit. In addition, the oxygen may be discharged through an anode outlet, and the hydrogen ions and the electrons may be converted into hydrogen at the cathode.

The first pump 210 serves to forcibly move (circulate) the reaction fluid (including the liquid reaction fluid) in the first circulation line 200 along the first circulation line 200.

Various pumps capable of providing pumping power required to move the reaction fluid may be used as the first pump 210. The present disclosure is not restricted or limited by the type and structure of the first pump 210.

In particular, the first pump 210 may be provided in the first circulation line 200 and disposed between the inlet of the water electrolysis stack 220 and the gas-liquid separator 100. According to another embodiment of the present disclosure, the first pump may be provided in the first circulation line and disposed between the outlet of the water electrolysis stack and the gas-liquid separator.

The second circulation line 300 is connected to the gas-liquid separator 100 in parallel with the first circulation line 200 via the property processing unit 320.

In this case, the configuration in which the second circulation line 300 and the first circulation line 200 are connected in parallel with each other to the gas-liquid separator 100 means that the first circulation line 200 defines a first circulation loop (a route along which the liquid reaction fluid circulates) passing through the gas-liquid separator 100 and the second circulation line 300 defines a second circulation loop separately separated from the first circulation loop.

More specifically, the liquid reaction fluid separated by the gas-liquid separator 100 may be supplied to the property processing unit 320 along the second circulation line 300. The liquid reaction fluid processed by the property processing unit 320 may be supplied back to the gas-liquid separator 100 along the second circulation line 300.

The second circulation line 300 may have various structures capable of being connected to the gas-liquid separator 100 via the property processing unit 320. The present disclosure is not restricted or limited by the structure and shape of the second circulation line 300.

In another form, the second circulation line 300 is connected to an approximately lower end (based on FIG. 1) of the gas-liquid separator 100. For example, an inlet end of the second circulation line 300 may be connected to the lateral surface of the lower end of the gas-liquid separator 100, and an outlet end of the second circulation line 300 may be connected to a top surface of the upper end of the gas-liquid separator 100.

In particular, the inlet end of the second circulation line 300 may be connected to the gas-liquid separator 100 so that the inlet end of the second circulation line 300 is positioned at a position lower than a level of the liquid reaction fluid separated by the gas-liquid separator 100. For example, the inlet end of the second circulation line 300 may be connected to the gas-liquid separator 100 so that the inlet end of the second circulation line 300 is positioned between the lower end of the gas-liquid separator 100 and a section corresponding to approximately ⅓ of the height of the gas-liquid separator 100. More particularly, the inlet end of the second circulation line 300 may be connected to the lowermost end of the gas-liquid separator 100.

According to another embodiment of the present disclosure, the second circulation line may be connected to the upper end or other portions of the gas-liquid separator.

The property processing unit 320 may be provided in the second circulation line 300 and process the properties of the liquid reaction fluid.

For reference, in the embodiment of the present disclosure, the configuration in which the properties of the liquid reaction fluid are processed means that the properties (or states) of the liquid reaction fluid, such as a temperature and an ion content of the liquid reaction fluid, are processed (adjusted).

Various processing devices capable of processing the properties of the liquid reaction fluid may be used as the property processing unit 320. The present disclosure is not restricted or limited by the type and number of the property processing units 320.

According to the exemplary embodiment of the present disclosure, the property processing unit 320 may include at least one of an ion filter 322 provided in the second circulation line 300 and configured to filter out ions from the liquid reaction fluid or a heat exchanger 324 provided in the second circulation line 300 and configured to exchange heat with the liquid reaction fluid.

In one form, the property processing unit 320 may include both the ion filter 322 and the heat exchanger 324.

The ion filter 322 serves to filter out the ions contained in the liquid reaction fluid having passed through the gas-liquid separator 100.

For reference, if electrical conductivity of the liquid reaction fluid increases because of corrosion, exudation, or the like of the system, electricity flows along the liquid reaction fluid, which causes a problem in that the water electrolysis stack 220 is short-circuited, and thus the performance of the water electrolysis stack 220 severely deteriorates or electric current flows toward the liquid reaction fluid. Therefore, the liquid reaction fluid needs to maintain low electrical conductivity.

The ion filter 322 serves to remove the ions contained in the liquid reaction fluid in order to maintain the electrical conductivity of the liquid reaction fluid to a predetermined level or lower.

Various filters capable of removing (filtering out) the ions contained in the liquid reaction fluid may be used as the ion filter 322. The present disclosure is not restricted or limited by the type and structure of the ion filter 322.

The heat exchanger 324 serves to exchange heat with the liquid reaction fluid and adjust a temperature of the liquid reaction fluid (e.g., cool the liquid reaction fluid) moving along the second circulation line 300.

As described above, the heat exchanger 324 may lower the temperature of the liquid reaction fluid by exchanging heat with the liquid reaction fluid moving along the second circulation line 300. Therefore, when the temperature of the water electrolysis stack 220 is raised to a predetermined level or higher, the temperature of the liquid reaction fluid to be supplied to the water electrolysis stack 220 may be lowered, thereby inhibiting the water electrolysis stack 220 from being overheated.

The heat exchanger 324 may have various structures capable of exchanging heat between a cooling medium (e.g., coolant) and the liquid reaction fluid. The present disclosure is not restricted or limited by the type and structure of the heat exchanger 324. According to another embodiment of the present disclosure, the heat exchanger may be configured by using an air-cooled cooling means (e.g., radiator) or the like.

According to the exemplary embodiment of the present disclosure, the electrochemical system 10 may include a branch line 302 having a first end connected to the second circulation line 300 and disposed between an inlet of the ion filter 322 and the gas-liquid separator 100, and a second end connected to the second circulation line 300 and disposed between an outlet of the ion filter 322 and the gas-liquid separator 100. The heat exchanger 324 may be provided in the branch line 302.

In the embodiment of the present disclosure illustrated and described above, the ion filter 322 and the heat exchanger 324 may be connected in parallel with each other in the second circulation line 300. However, according to another embodiment of the present disclosure, the separate branch line may be excluded, and the ion filter and the heat exchanger may be connected (disposed) in series in the second circulation line.

The second pump 310 serves to forcibly move (circulate) the liquid reaction fluid in the second circulation line 300 along the second circulation line 300.

Various pumps capable of providing pumping power required to move the liquid reaction fluid may be used as the second pump 310. The present disclosure is not restricted or limited by the type and structure of the second pump 310.

In particular, the second pump 310 may be provided in the second circulation line 300 and positioned at an upstream side of the branch line 302. More specifically, the second pump 310 may be disposed between one end of the branch line 302 and the inlet end of the second circulation line 300 and positioned at the upstream side of the branch line 302.

According to another embodiment of the present disclosure, the second pump may be provided in the second circulation line and positioned at a downstream side of the branch line. Alternatively, the second pump may be disposed in the branch line.

According to the embodiment of the present disclosure described above, the first circulation line 200 and the second circulation line 300 may be connected in parallel with each other to the gas-liquid separator 100, and the first pump 210 may supply the liquid reaction fluid to the water electrolysis stack 220 provided in the first circulation line 200. The liquid reaction fluid treated (separated) by the gas-liquid separator 100 may separately circulate along the first circulation line 200 and the second circulation line 300. The first pump 210 provided in the first circulation line 200 may supply the liquid reaction fluid to the water electrolysis stack 220 provided in the first circulation line 200, and the second pump 310 provided in the second circulation line 300 may supply the liquid reaction fluid to the property processing unit 320 provided in the second circulation line 300. Therefore, the condition (e.g., the pressure and the flow rate) for supplying the liquid reaction fluid to the water electrolysis stack 220 may be implemented to be different from the condition for supplying the liquid reaction fluid to the property processing unit 320.

For example, the liquid reaction fluid may be supplied to the water electrolysis stack 220 under the supply condition (e.g., the high pressure and flow rate) capable of optimizing the performance and efficiency of the water electrolysis stack 220. Further, the liquid reaction fluid may be supplied to the property processing unit 320 (the ion filter and the heat exchanger) under the supply condition (e.g., the low pressure and flow rate) capable of optimizing the performance and efficiency of the property processing unit 320.

As described above, depending on the required condition and usage environment, the liquid reaction fluids may be respectively supplied to the water electrolysis stack 220 and the property processing unit 320 under the different supply conditions. Therefore, it is possible to improve the performance and efficiency of the water electrolysis stack 220 and the property processing unit 320.

In addition, in the embodiment of the present disclosure, the second pump 310, which operates separately from the first pump 210, may adjust the condition for supplying the liquid reaction fluid to the property processing unit 320, and the condition for supplying the liquid reaction fluid to the property processing unit 320 may be maintained as a preset reference condition. Therefore, it is possible to reduce or minimize the deterioration in performance of the property processing unit 320 and the damage to the property processing unit 320 that may be caused when the condition for supplying the liquid reaction fluid deviates from the reference condition, thereby improving the durability thereof.

Moreover, the property processing unit 320 (e.g., the ion filter) only need to treat the liquid reaction fluid at a comparatively low pressure or flow rate. Therefore, it is possible to effectively treat the liquid reaction fluid without increasing the performance or size of the property processing unit 320 (without using a high-quality property processing unit 320).

According to the exemplary embodiment of the present disclosure, the electrochemical system 10 may include an ion sensor 240 provided in the first circulation line 200 and configured to sense the ion contained in the liquid reaction fluid, and a temperature sensor 230 provided in the first circulation line 200 and configured to sense a temperature of the liquid reaction fluid. The second pump 310 may adjust the flow rate of the liquid reaction fluid passing through the second pump 310, on the basis of the sensing result of at least any one of the ion sensor 240 and the temperature sensor 230.

In one form, the flow rate of the liquid reaction fluid passing through the second pump 310 is adjusted on the basis of the sensing results of the ion sensor 240 and the temperature sensor 230.

As described above, the ion sensor 240 and the temperature sensor 230 may be provided in the first circulation line 200, and the flow rate of the liquid reaction fluid passing through the second pump 310 may be adjusted on the basis of the temperature of the liquid reaction fluid sensed by the temperature sensor 230 and the ion (ion content) in the liquid reaction fluid sensed by the ion sensor 240. Therefore, it is possible to supply the liquid reaction fluid to the ion filter 322 and the heat exchanger 324 under the condition capable of optimizing the operation of the water electrolysis stack 220 (with the flow rate capable of maximizing the performance and efficiency of the ion filter 322 and the heat exchanger 324).

According to the embodiment of the present disclosure, the temperature of and the ion (ion content) in the liquid reaction fluid to be supplied to the water electrolysis stack 220 may be sensed in real time, and the flow rate of the liquid reaction fluid passing through the second pump 310 may be adjusted on the basis of the sensing results of the ion sensor 240 and the temperature sensor 230. Therefore, it is possible to obtain an advantageous effect of further improving the performance and efficiency of the water electrolysis stack 220.

According to the exemplary embodiment of the present disclosure, the electrochemical system 10 may include a valve 304 provided in the second circulation line 300 and disposed between the second pump 310 and the ion filter 322. The valve 304 may adjust the flow rate of the liquid reaction fluid to be supplied to the ion filter 322 on the basis of the sensing result of at least any one of the ion sensor 240 and the temperature sensor 230.

For example, the valve 304 may be disposed at one end of the branch line 302. Alternatively, the valve may be disposed between one end of the branch line and the ion filter.

Various valve means capable of adjusting the flow rate of the liquid reaction fluid to be supplied to the ion filter 322 may be used as the valve. The present disclosure is not restricted or limited by the type and structure of the valve.

For example, a typical three-way valve may be used as the valve 304. More specifically, the valve 304 may include a first port (not illustrated) connected to the second circulation line 300 so that the liquid reaction fluid having passed through the second pump 310 is introduced thereinto, a second port (not illustrated) connected to the second circulation line 300 so that the liquid reaction fluid having passed through the valve 304 is introduced into the ion filter 322, and a third port (not illustrated) connected to one end of the branch line 302. Therefore, it is possible to adjust the flow rate of the liquid reaction fluid to be supplied to the ion filter 322 by opening or closing the second port. In this case, the configuration in which the second port is opened or closed includes both a configuration in which the second port is completely closed or fully opened and a configuration in which a valve opening angle (opening degree) of the second port is adjusted.

As described above, it is possible to obtain an advantageous effect of improving the performance and efficiency of the ion filter 322 by selectively adjusting the flow rate of the liquid reaction fluid to be supplied to the ion filter 322.

In addition, the flow rate of the liquid reaction fluid passing through the heat exchanger 324 may be adjusted by selectively adjusting the flow rate of the liquid reaction fluid to be supplied to the ion filter 322. Therefore, it is possible to more accurately and quickly control the temperature of the liquid reaction fluid. For example, when the temperature of the water electrolysis stack 220 is raised to a predetermined level or higher, the liquid reaction fluid supplied to the second circulation line may entirely pass through the heat exchanger 324 without passing through the ion filter 322. Therefore, it is possible to more quickly lower the temperature of the liquid reaction fluid.

Referring to FIG. 3, according to the exemplary embodiment of the present disclosure, the electrochemical system 10 may include a supply line 110 connected to the gas-liquid separator 100 and configured to supply the liquid reaction fluid to the gas-liquid separator 100.

The liquid reaction fluid with which the gas-liquid separator 100 is filled is gradually consumed by the electrochemical reaction in the water electrolysis stack 220. Therefore, the liquid reaction fluid needs to be additionally supplied to the gas-liquid separator 100 in accordance with the amount of consumed liquid reaction fluid.

The supply line 110 may have various structures capable of supplying the liquid reaction fluid into the gas-liquid separator 100 from the outside of the gas-liquid separator 100. The present disclosure is not restricted or limited by the structure and shape of the supply line 110.

For example, the supply line 110 may be connected to an upper end of the gas-liquid separator 100. When a storage amount of the liquid reaction fluid stored in the gas-liquid separator 100 is smaller than a reference storage amount, the liquid reaction fluid may be supplied through the supply line 110.

In particular, the outlet end of the first circulation line 200 may be connected to the supply line 110, and the liquid reaction fluid having passed through the first circulation line 200 may be supplied to the gas-liquid separator 100 via the supply line 110.

Because the outlet end of the first circulation line 200 is connected to the supply line 110 as described above, a liquid reaction fluid (additional reaction fluid) W2 stored in the supply line 110 may be supplied to the gas-liquid separator 100 by means of a liquid reaction fluid (circulating reaction fluid) W1 discharged through the outlet end of the first circulation line 200. Therefore, it is possible to exclude the use of a separate pump for supplying the liquid reaction fluid, stored in the supply line 110, to the gas-liquid separator 100.

This is based on the fact that the liquid reaction fluid W1 discharged through the outlet end of the first circulation line 200 (the reaction fluid discharged from the water electrolysis stack) has a high flow velocity (e.g., about 50 to 100 LPM) and a pressure (e.g., 2 to 5 bar at about 50° C.) comparatively higher than the internal pressure of the gas-liquid separator 100. Since the liquid reaction fluid (circulating reaction fluid) W1 having the high pressure and flow velocity is discharged into the supply line 110, the liquid reaction fluid (additional reaction fluid) W2 stored in the supply line 110 may also be supplied to the gas-liquid separator 100 without using a separate pump when the reaction fluid W1 discharged from the water electrolysis stack 220 circulates toward the gas-liquid separator 100.

More particularly, the electrochemical system 10 may include a nozzle 202 connected to the outlet end of the first circulation line 200 and configured to inject the liquid reaction fluid W1 into the supply line 110 along the supply line 110, and an ejector 204 disposed at an end of the nozzle 202.

Various nozzle members capable of injecting the liquid reaction fluid (circulating reaction fluid) W1 at a high velocity may be used as the nozzle 202. The present disclosure is not restricted or limited by the type and structure of the nozzle 202.

The ejector 204 serves to suck and inject the liquid reaction fluid (additional reaction fluid) W2 at the periphery of the nozzle by using an injection pressure of the liquid reaction fluid (circulating reaction fluid) W1 injected from the nozzle 202.

The ejector 204 may have various structures capable of sucking and injecting the liquid reaction fluid (additional reaction fluid) W2 at the periphery of the nozzle 202. The present disclosure is not restricted or limited by the type and structure of the ejector 204.

Meanwhile, in the embodiment of the present disclosure illustrated and described above, the example has been described in which the outlet end of the first circulation line 200 is connected to the supply line 110. However, according to another embodiment of the present disclosure, the outlet end of the second circulation line may be connected to the supply line. In addition, even though the outlet end of the second circulation line is connected to the supply line, the nozzle and the ejector may be applied to the outlet end of the second circulation line.

However, because the pressure and flow velocity of the liquid reaction fluid discharged through the outlet end of the first circulation line are higher than the pressure and flow velocity of the liquid reaction fluid discharged through the outlet end of the second circulation line, the outlet end of the first circulation line may be connected to the supply line.

Figure 4:
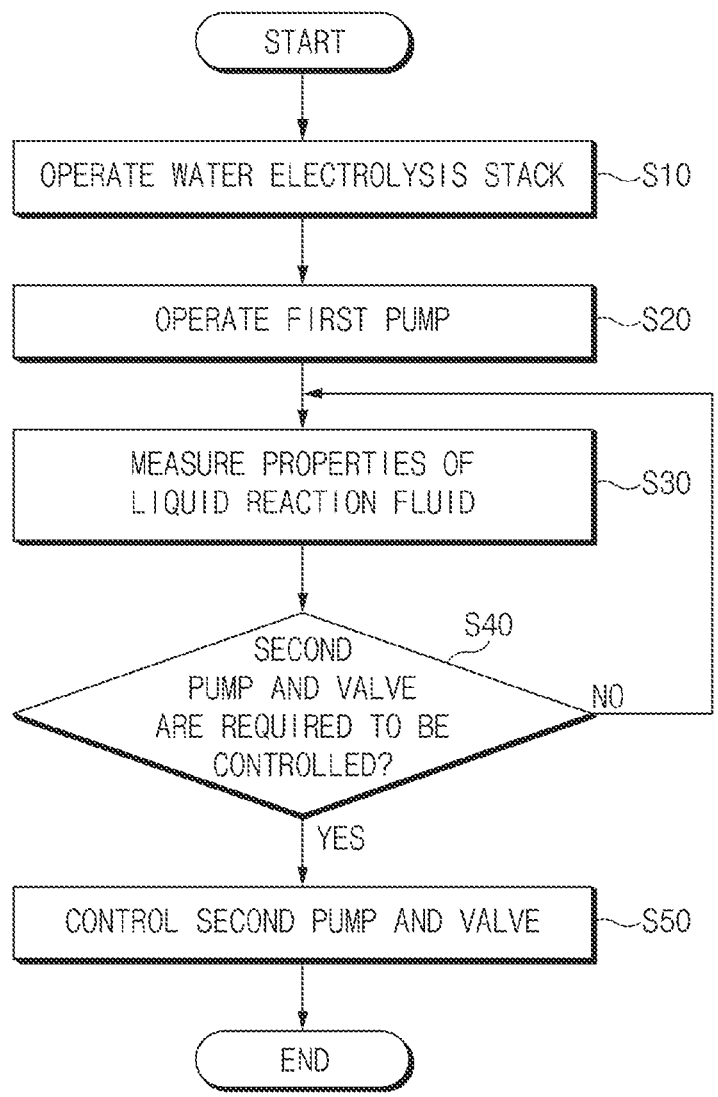
FIG. 4 a flowchart for explaining a method of controlling the electrochemical system according to another embodiment of the present disclosure.

Meanwhile, FIG. 4 is a flowchart for explaining a method of controlling the electrochemical system according to the embodiment of the present disclosure. Further, the parts identical and equivalent to the parts in the above-mentioned configuration are designated by the identical or equivalent reference numerals, and detailed descriptions thereof are omitted.

Referring to FIG. 4, a method of controlling the electrochemical system according to the embodiment of the present disclosure includes: a step S10 of sensing an operation (operation initiation) signal for the water electrolysis stack 220, a step S20 of operating the first pump 210 when an operation of the water electrolysis stack 220 is initiated, a step S30 of measuring properties of the liquid reaction fluid, a step S40 of determining whether to control at least one of the second pump 310 or the valve on the basis of the properties of the liquid reaction fluid, and a step S50 of controlling at least any one of the second pump 310 and the valve when the properties of the liquid reaction fluid do not reach the reference condition.

First, the first pump 210 operates when the operation of the water electrolysis stack 220 is initiated.

Next, whether to control at least any one of the second pump 310 and the valve is determined on the basis of the sensing result (the properties of the liquid reaction fluid) of at least any one of the ion sensor 240 and the temperature sensor 230.

Next, when it is determined that at least any one of the second pump 310 and the valve is required to be controlled, at least any one of the second pump 310 and the valve may be controlled, such that the flow rate of the liquid reaction fluid to be supplied to the ion filter 322 and the heat exchanger 324 may be adjusted.

For example, when it is sensed that the liquid reaction fluid contains a large number of ions, the second pump 310 may be operated to allow the liquid reaction fluid to pass through the ion filter 322, which makes it possible to remove the ions from the liquid reaction fluid. In contrast, when it is sensed that the temperature of the liquid reaction fluid is high, the second pump 310 may be operated, and the opening degree of the valve may be adjusted, such that the overall liquid reaction fluid supplied to the second circulation line passes through the heat exchanger 324 without passing through the ion filter 322. Therefore, it is possible to more quickly lower the temperature of the liquid reaction fluid.

According to the embodiment of the present disclosure described above, it is possible to obtain an advantageous effect of improving the performance and efficiency.

In particular, according to the embodiment of the present disclosure, it is possible to obtain an advantageous effect of separately optimizing the flow rate and pressure of the liquid reaction fluid to be supplied to the water electrolysis stack and the property processing unit and improving the performance and efficiency of the water electrolysis stack and the property processing unit.

In addition, according to the embodiment of the present disclosure, it is possible to obtain an advantageous effect of improving ionic conduction and ion exchange efficiency of the reaction fluid and improving the efficiency in adjusting the temperature of the reaction fluid to be supplied to the stack by optimizing the flow rate and pressure of the reaction fluid.

In addition, according to the embodiment of the present disclosure, it is possible to obtain an advantageous effect of inhibiting the deformation of and damage to the property processing unit and improving the durability thereof.

In addition, according to the embodiment of the present disclosure, it is possible to obtain an advantageous effect of contributing to miniaturizing the pump and minimizing the load of the pump.

In addition, according to the embodiment of the present disclosure, it is possible to obtain an advantageous effect of minimizing the power consumption of the pump and improving the energy efficiency.

In addition, according to the exemplary embodiment of the present disclosure, it is possible to obtain an advantageous effect of simplifying the structure and improving the degree of design freedom and the spatial utilization.

In addition, according to the embodiment of the present disclosure, it is possible to exclude the use of a separate pump for supplying the liquid reaction fluid to the gas-liquid separator and contribute to miniaturizing the system.

While the embodiments have been described above, the embodiments are just illustrative and not intended to limit the present disclosure. It can be appreciated by those having ordinary skill in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure.

What is claimed is:

1. An electrochemical system comprising:
  a gas-liquid separator configured to separate a reaction fluid into a gaseous reaction fluid and a liquid reaction fluid;
  a first circulation line connected to the gas-liquid separator and configured to circulate the liquid reaction fluid;
  a water electrolysis stack provided in the first circulation line;
  a first pump provided in the first circulation line;
  a second circulation line connected to the gas-liquid separator in parallel with the first circulation line and configured to circulate the liquid reaction fluid;
  a property processing unit provided in the second circulation line and configured to process properties of the liquid reaction fluid, wherein the property processing unit comprises at least one of an ion filter configured to filter out an ion from the liquid reaction fluid or a heat exchanger configured to exchange heat with the liquid reaction fluid;
  a second pump provided in the second circulation line;
  a supply line connected to the gas-liquid separator and configured to supply the liquid reaction fluid to the gas-liquid separator;
  a nozzle connected to an outlet end of the first circulation line and configured to inject the liquid reaction fluid into the supply line along the supply line; and
  an ejector disposed at an end of the nozzle.

2. The electrochemical system of claim 1, wherein the property processing unit comprises the ion filter and the heat exchanger,
  wherein the second circulation line comprises a branch line having a first end connected to the second circulation line and disposed between an inlet of the ion filter and the gas-liquid separator, and a second end connected to the second circulation line and disposed between an outlet of the ion filter and the gas-liquid separator, and
  wherein the heat exchanger is provided in the branch line.

3. The electrochemical system of claim 2, wherein the second pump is provided in the second circulation line and positioned at an upstream side of the branch line.

4. The electrochemical system of claim 2, comprising:
  an ion sensor provided in the first circulation line and configured to sense the ion contained in the liquid reaction fluid; and
  a temperature sensor provided in the first circulation line and configured to sense a temperature of the liquid reaction fluid,
  wherein the second pump adjusts a flow rate of the liquid reaction fluid passing through the second pump based on sensing results of at least one of the ion sensor or the temperature sensor.

5. The electrochemical system of claim 4, comprising:
  a valve provided in the second circulation line and disposed between the second pump and the ion filter,
  wherein the valve adjusts the flow rate of the liquid reaction fluid to be supplied to the ion filter based on the sensing results of at least one of the ion sensor or the temperature sensor.

6. The electrochemical system of claim 1, wherein the first pump is provided between an inlet of the water electrolysis stack and the gas-liquid separator.

7. The electrochemical system of claim 1, wherein the outlet end of the first circulation line is connected to the supply line, and the liquid reaction fluid having passed through the first circulation line is supplied to the gas-liquid separator via the supply line.

* * * * *